(12) United States Patent
Pritt

(10) Patent No.: US 6,516,097 B1
(45) Date of Patent: Feb. 4, 2003

(54) IMAGE SEGMENTATION SYSTEM

(75) Inventor: Mark D. Pritt, Walkersville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/354,723

(22) Filed: Jul. 16, 1999

(51) Int. Cl.⁷ .............................................. G06K 9/44
(52) U.S. Cl. ........................ 382/256; 382/257; 382/258
(58) Field of Search ................................. 382/256–258

(56) References Cited

U.S. PATENT DOCUMENTS

| 3,987,412 A | * | 10/1976 | Morrin, II | 382/242 |
| 4,630,306 A | * | 12/1986 | West et al. | 382/145 |
| 4,642,813 A | * | 2/1987 | Wilder | 348/125 |
| 5,065,437 A | * | 11/1991 | Bloomberg | 358/456 |
| 5,120,940 A | * | 6/1992 | Willsie | 235/462.08 |
| 5,319,551 A | * | 6/1994 | Sekiguchi et al. | 382/131 |
| 5,608,816 A | * | 3/1997 | Kawahara et al. | 348/126 |
| 5,734,736 A | * | 3/1998 | Palmer et al. | 244/161 |
| 5,761,392 A | * | 6/1998 | Yacoub et al. | 345/596 |
| 5,995,677 A | * | 11/1999 | Jones | 358/451 |
| 6,148,114 A | * | 11/2000 | Han | 382/256 |
| 6,154,575 A | * | 11/2000 | Hashimoto | 382/195 |
| 6,181,438 B1 | * | 1/2001 | Bracco et al. | 358/1.2 |

OTHER PUBLICATIONS

"Fundamentals of Digital Image Processing", Anil K. Jain, Chapter 9, pp. 342–430, Prentice Hall, Englewood Cliffs, NJ 07632, 1989.

* cited by examiner

Primary Examiner—Joseph Mancuso
Assistant Examiner—Anand Bhatnagar
(74) Attorney, Agent, or Firm—Richard L. Aitken; Venable

(57) ABSTRACT

In a system for segmenting a pixel based image, pixels containing image boundaries are identified. The image boundaries are then fattened by repeatedly adding fattening rows of pixels to the pixels containing boundaries to separate the remaining pixels into separate segments. The separate segments are then grown back to their original size before the boundaries were fattened. This operation has the effect of linking the boundaries together to separate the image into segments and to extend incomplete boundaries into complete boundaries around segments in the image.

14 Claims, 7 Drawing Sheets

|   |   |   |
|---|---|---|
| M | M | M |
| R | F | R |
| N | N | N |

FIG.6A

|   |   |   |
|---|---|---|
| M | R | N |
| M | F | N |
| M | R | N |

FIG.6B

IMAGE SEGMENTATION SYSTEM

This invention relates to image processing and more particularly to a method and apparatus for image segmentation which is the operation of dividing an image into regions represented by the image data.

BACKGROUND ON THE INVENTION

Many different image processing applications detect objects and images by segmenting the image into regions represented in the image data and then identifying the regions that belong to the object while discarding the regions that belong to the background. Examples of such applications are optical character recognition, military target recognition, and assembly line product inspection. In optical character recognition applications, for example, the various characters have to be segmented before they can be identified. The text entitled "Fundamentals of Digital Image Processing" by A. J. Jain, published by Prentice-Hall, Englewood Cliffs, N.J., in 1989, describes many prior art techniques of image segmentation. These prior art techniques attempt to identify the edges or boundaries of the regions to be segmented by methods, such as edge detection, texture analysis, and contour following. The prior art techniques typically fail to satisfactorily achieve segmentation because the edges or boundaries are almost always noisy and incomplete. Yet the boundaries must somehow be joined or completed in order to separate the regions so they can be properly identified. One class of techniques for segmentation are called connectivity techniques which trace the edges and attempt to connect them. The incomplete edges are attempted to be linked by heuristic graph searching or by dynamic programming to optimize some evaluation function. The well-known Hough transform, described in the aforementioned Jain text, is employed to identify straight or curved lines in incomplete edges. Other techniques include template matching, region growing and morphological processes.

None of the prior art methods for boundary completion or image segmentation are satisfactory. For example, the Hough transform fails in noisier shadow corrupted parts of the image where the boundaries do not have clearly linear structure. Contour following methods also fail under these conditions. Texture analysis is useless where the image does not have meaningful textural information. Template matching cannot be used in absence of advance knowledge of the anticipated shapes of the regions. None of the prior art techniques will work to achieve segmentation on some images.

Accordingly, there is a need for an image segmentation technique which will be effective to segment images containing shadow corrupted parts of the image or have boundaries which do not have clear linear structure and where the images lack meaningful textural information.

SUMMARY OF THE INVENTION

In accordance with the invention, an image is segmented by first identifying and labeling the pixels containing image boundaries. The image boundaries are fattened by adding pixels to the boundaries to separate the region of the image which are not labeled as boundaries into separate segments. The separate segments are then grown back to their original size before the boundaries were fattened. This operation has the effect of linking the boundaries together to separate the image into segments. Since the system completes boundaries between the segments formed by the system, the system may also be considered as a boundary completion or edge linking system. The technique is effective in segmenting images in which the boundaries in the image are incomplete and which could not be segmented by prior art techniques.

BRIEF DESCRIPTION OF THE DRAWINGS

FIGS. 6a and 6b illustrate templates used to test region separation in the system of the invention.

DESCRIPTION OF A PREFERRED EMBODIMENT

Figure 1:
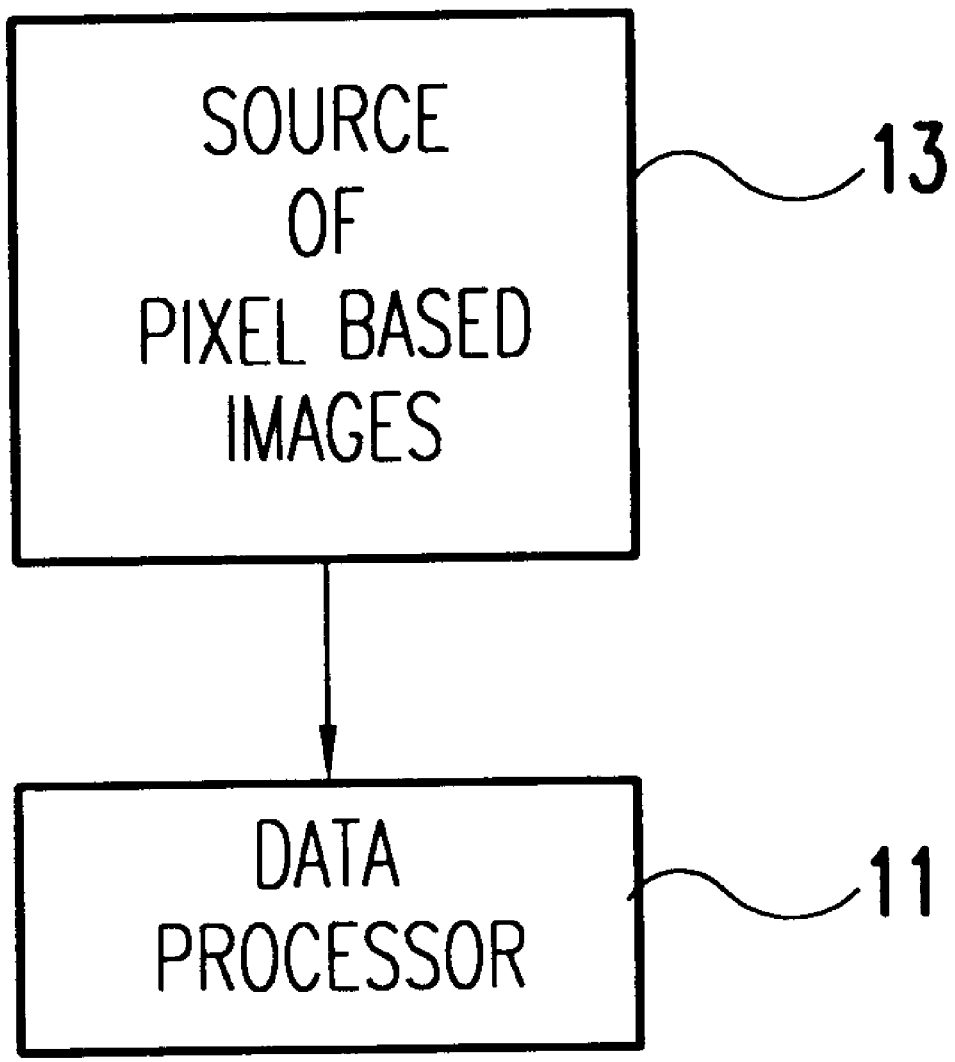
FIG. 1 is a block diagram of the apparatus employed by the system of the invention.

As shown in FIG. 1, data representing an image to be segmented is provided to a data processor 11 from an image data source 13. The data processor 11 is provided with the program of the invention to carry out segmentation of an image containing incomplete boundaries represented by data provided to the data processor 11 from the source 13.

Figure 2:
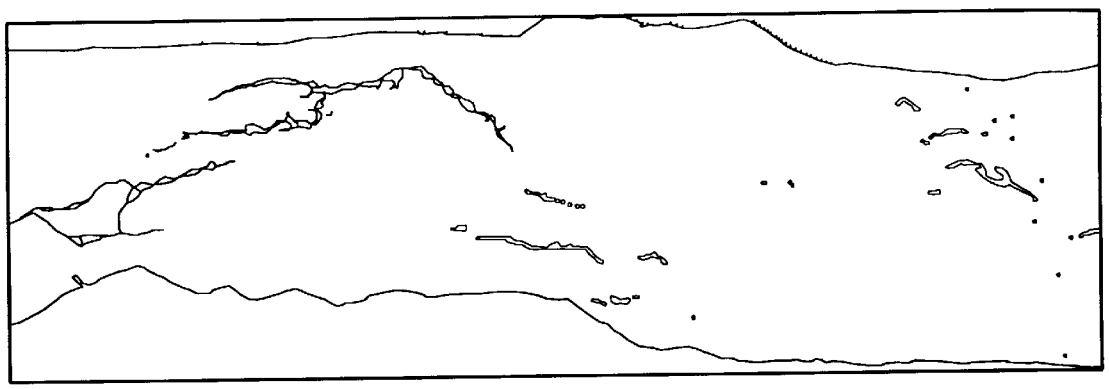
FIG. 2 illustrates an image to which the applicant's segmentation algorithm is applicable.
Figure 3:
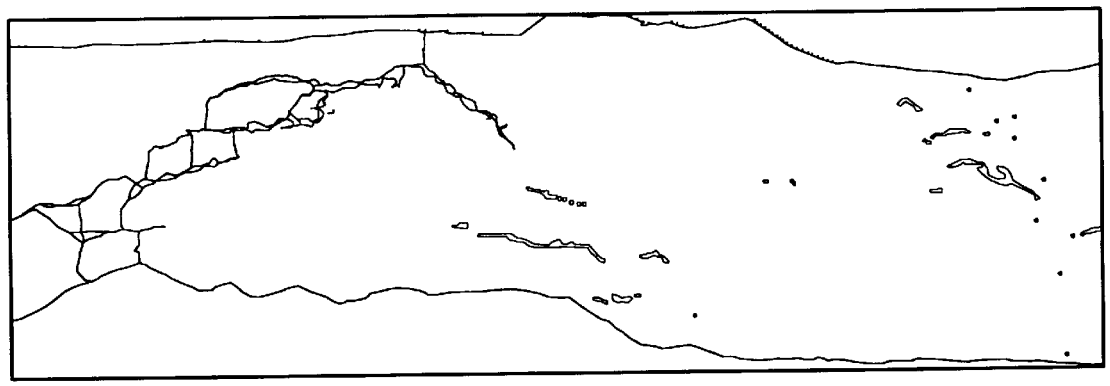
FIG. 3 illustrates the image of FIG. 2 after it has been segmented by the system of the present invention.

FIG. 2 illustrates an example of an image containing incomplete boundaries 15 on which the system of the present invention will operate and which will divide the image shown in FIG. 2 into segments. FIG. 3 shows the image of FIG. 2 after it has been segmented by the process of the invention.

Figure 4:
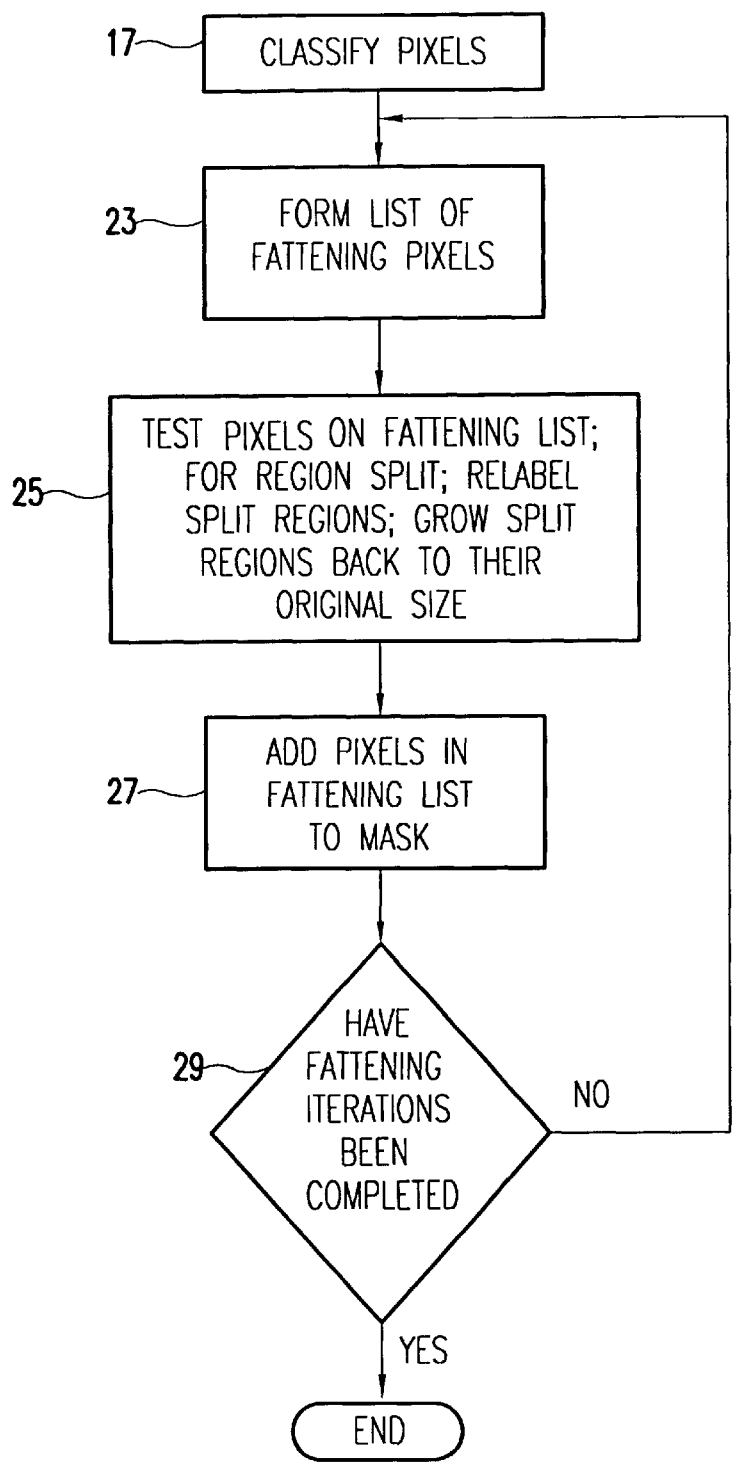
FIG. 4 is a flow chart of a program to carry out the segmentation process of the present invention.
Figure 5A:
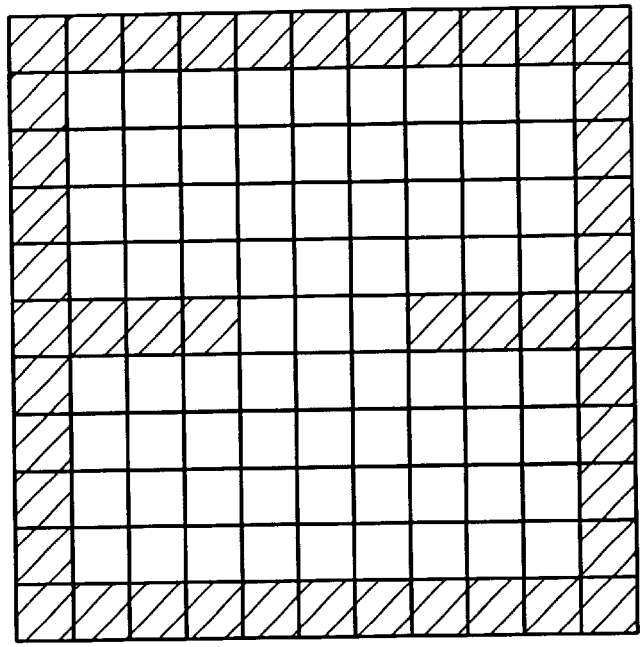
FIGS. 5a though 5f schematically illustrate the segmentation procedure of the present invention as applied to a specific image.
Figure 5B:
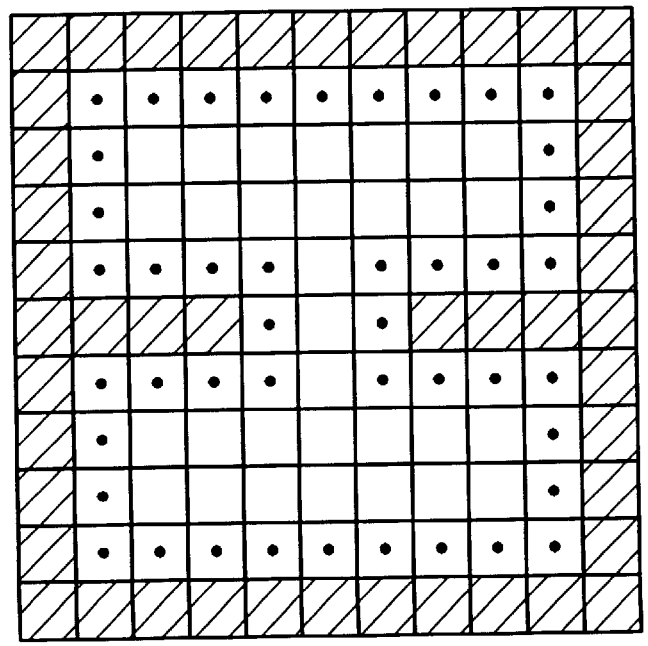
Figure 5C:
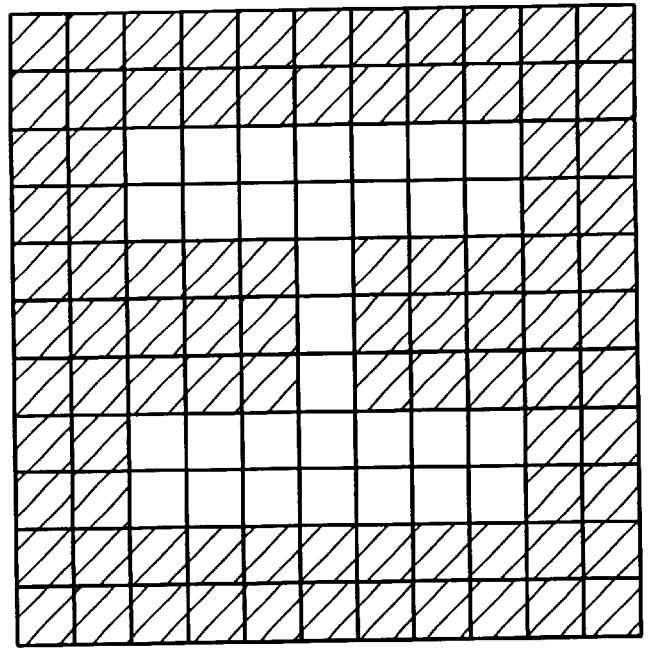
Figure 5D:
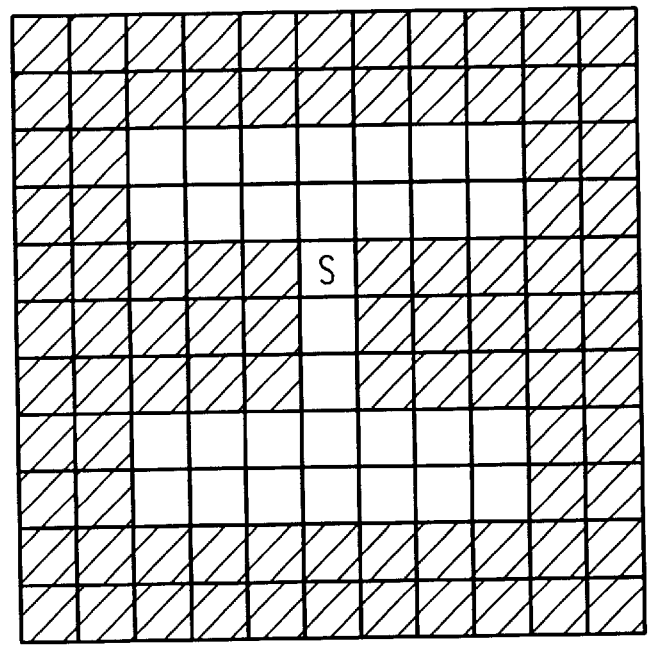
Figure 5E:
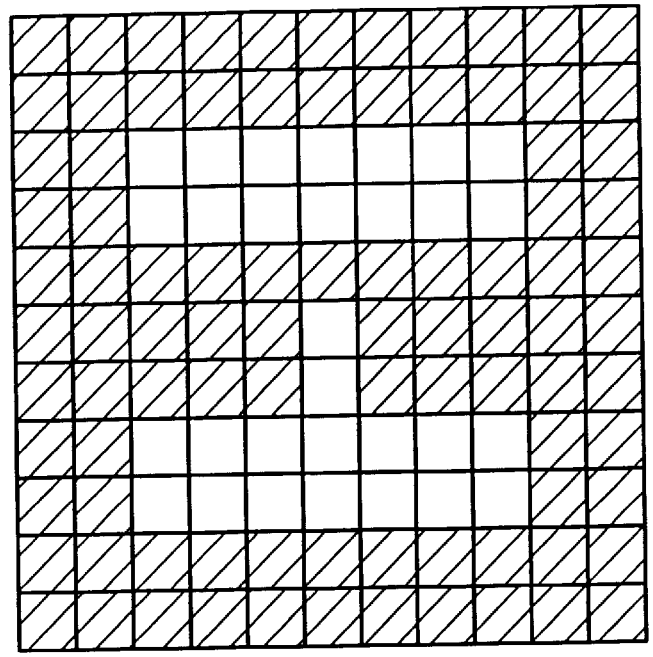
Figure 5F:
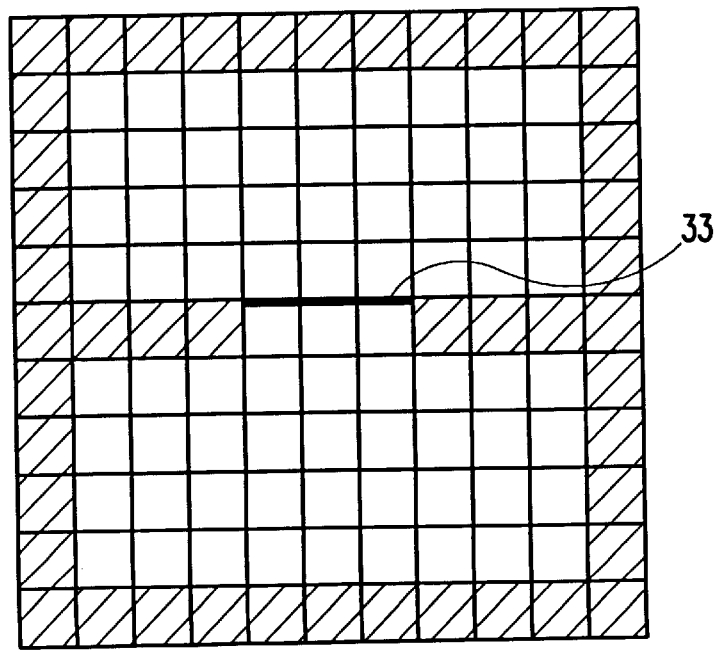

As shown in the flow chart of FIG. 4, the process of the present invention in step 17 labels the pixels of the image being processed with the pixels containing a boundary being assigned or labeled with the value 0 and the other pixels in the image being assigned or labeled the value 1. The pixels labeled with the value 0 are called mask pixels and the set of mask pixels in the image is called the mask. At this time, any regions that are completely isolated by mask pixels are assigned unique integer labels starting at 2. Pixels labeled with 1 or a higher integer are called region pixels and comprise region of the image to be divided into segments. FIGS. 5a through 5f schematically illustrate the operation of the process of invention performed on an image example. As shown in FIG. 5a, the cross hatched pixels are the mask pixels, which are labeled with the integer 0 in the step 17 while the remaining region pixels shown blank in FIG. 5a are labeled with the integer 1. Following the labeling of the pixels in step 17, the mask is fattened in successive iterations through steps 23, 25, and 27. In the first iteration, a list of fattening pixels is formed in step 23. In this step, all of the pixels which border on a mask pixel in the image are placed on the list of fattening pixels. In FIG. 5b, the pixels on the list of fattening pixels of the first iteration are identified by a dot. The pixels on the fattening pixel list are then considered one by one in step 25. If the addition of any fattening pixel to the mask will split the region pixels, (pixels labeled 1 or within higher integer and shown blank in FIG. 5a) to disjoint regions of greater than a selected minimum size, then the two disjoint regions are relabeled as two distinct regions by labeling one of the disjoint regions with a new integer so that each disjoint region will have a different integer label. In addition, the fattening pixel which split the region pixels into two regions is added to the mask and the two disjoint regions are grown back to their original size. As shown in FIG. 5b, none of the first iteration of fattening pixels separate the region pixels into two regions. Next, in step 27, the fattening pixels in the fattening pixel list, are added to the mask pixels by labeling those pixels with 0. Thus, a border of fattening pixels is added to the mask, which will now be a fat mask represented by the cross hatched pixels in FIG. 5c. In decision step 29, it is determined whether or not all of the fattening iterations have been completed, such as when the region pixels are completely covered by the mask or when a predetermined number of iterations have been completed. In the example of FIGS. 5a through 5f, the fattening iterations have not been completed on completion of the first fattening iteration and the program returns to step 23 in which another list of fattening pixels that border the fat mask pixels is formed. Then these pixels are considered one at a time in step 25 to determine whether or not they split the region pixels into two disjoint regions. As shown in FIG. 5d, the pixel labeled "S" splits the region pixels into two disjoint regions. When the splitting of the region pixels in the two regions is detected, the pixel that split the region is added to the fat mask as shown in FIG. 5e and is removed from the fattening list of pixels. One of the two split regions is relabeled so that it has a unique integer label leaving the remaining of the two split regions with the original integer label. The resulting two disjoint regions are shown in FIG. 5e. The two disjoint regions are then grown back to their original size as shown in FIG. 5f. In this disjoint region growing process, the disjoint regions themselves are fattened by adding pixels to the borders of the two disjoint regions until the disjoint regions grow back to their original size. As shown in FIG. 5f, the original one piece region is separated into two regions with a boundary between the regions at 33. The boundary effectively completes the broken horizontal line in the original image. After growing the disjoint regions back to their original size, the process returns the image to the state that existed when the pixel which split the region into two disjoint regions was added to the fattening list. In the example represented in FIGS. 5a through 5f, the process returns the image to the state shown in FIG. 5a. The process then continues and tests each of the remaining region pixels in the most recently formed fattening list to see if any of the remaining pixels further split the integer numbered regions into separate regions. In the example shown, one additional split would occur isolating a single pixel just below the pixel S, but this splitting is ignored because the resulting isolated region growing from this single pixel will be too small when it is grown back to the original size. The operator of the system sets a minimum size for each region isolated by the process and if an isolated region upon being grown back to its original size does not meet this minimum, the relabeling of the pixels of such isolated region is canceled.

In the process as described above, the mask, which started out as a set of incomplete boundaries, is gradually fattened. As it is fattened, disconnected pieces of the boundary join up and pinch off regions of the image as shown in FIG. 5c. These pinched off regions are then relabeled as new regions. After each iteration of forming a list comprising a border of fattening pixels, all of the pixels on the fattening list are added to the mask pixels and the process proceeds through the next iteration of forming a list comprising a border of fattening pixels and then testing each pixel of the list. This process continues until the region pixels are completely covered with the fat mask or until a predetermined number of fattening iterations have been performed, as determined in decision step 29. In the example of FIGS. 5a through 5f, the second iteration of fattening pixels completely covers the region pixels, at which point the process terminates.

The above described process requires a test to determine whether or not a fattening pixel splits a region into two disjoint segments. This test is performed in two steps, the first being a quick template test which makes an initial determination. If the template test indicates that two separate regions have not been isolated, then the fattening pixel is determined not to split the region pixels into two regions. If the template test determines that the region pixels may have been split into two regions, then a global test is performed to determine whether in fact the fattening pixel does split the region pixels into two regions. In the template test, a three-by-three pixel template is placed over the image and is centered on the fattening pixel which is being tested. The three-by-three pixel template as shown in FIG. 6a, wherein the upper three pixels of the template are labeled "M" and the lower three pixels of the template are labeled "N" and the pixels on each side of the fattening pixel are labeled "R". The fattening pixel being tested in FIG. 6a is labeled "F". If neither of the pixels labeled "R" are mask pixels and there is at least one mask pixel in the pixels labeled "M" and at least one mask pixel in the pixels labeled "N", then the template is satisfied and the fattening pixel is determined to locally split the region pixels into two regions. If the fattening pixel does not satisfy the template, the template is tested against a second template which is of the first template rotated through 90° as shown in FIG. 6b. The same template test is then performed to determine whether or not the fattening pixel provides a local splitting of the region pixels. If either one of the templates determines that there is a local split in the region pixels, then the test proceeds to the second or global test to confirm that the split of the region pixels is a complete split rather than just a local split. The local split test by the template weeds out most of the fattening pixels that do not split a region into two disjoint segments. The second test is accomplished by a standard region growing procedure that begins with the template which detected a local split. The growing procedure begins at one of the pixels labeled R of this template and then fills out the region that contains this pixel. If the resulting region does not contain the other pixel labeled R, then the determination is made that fattening pixel splits the region into two segments. If, however, the filling out of the region does encompass the other pixel labeled R, which would be in the case of a donut-shaped region pinched together by a fattening pixel, then it is determined that the fattening pixel does not split the region.

The pseudocode listing summary for the flow chart shown in FIG. 4 appears below:

Label the regions. The boundaries are labeled 0 and called the mask.
    Let fat_mask be the set of pixels that make up the mask.
    For loop=1 to num_loops
        Let fattening_pixels be the list of all pixels that border the fat_mask.
        For pass=1 to 2
        For each pixel P of the list of fattening_pixels
            If the addition of P to the fat_mask will split a region into two disjoint pieces, then
            Add P to the fat mask and remove P from the list of fattening_pixels.
            Re-label the split region into two distinct regions.

```
        Else
            If pass=2, then add P to the fat_mask and remove P
                from the list of fattening_pixels.
            End-If
        End-For
    End-For
End-For
```

The number of mask fattening iterations permitted in the program is controlled by num_loops in the above pseudocode. The size of the segments produced by the program is controlled in part by this number and by the selected minimum size for disjoint regions that result from the splitting step.

The pseudocode for the testing of whether a fattening pixel P splits the region pixels into two regions is set forth below:

```
Test the pixel P and the image against the two templates
    described above.
If at least one of the templates is satisfied, then
    Let R_1 and R_2 be the two pixels labeled "R" in the
        template.
    Use a standard region-growing algorithm to create the
        set S of pixels that belong to the region that contains
        R_1. Ignore all pixels that belong to the fat_mask.
    If R_2 belongs to S then
        The pixel P does not split the region.
    Else
        The pixel P splits the region.
    End-If
Else
    The pixel P does not split the region.
End-If
```

The pseudocode for the standard region growing algorithm is given below:

```
Let the sets S and S_new consist of the single pixel R_1.
While S_new is not empty
    Let S_new=0(the empty set).
    For each pixel P in the image
        If P borders a pixel of S but does not belong to
            fat_mask, then
            Add P to the sets S and S_new.
        End-If
    End-For
End-While
```

The pseudocode listing for relabeling and growing split regions is given below:

```
Let S be the set of pixels that belong to the original region.
    Include pixels from the fattened mask fat_mask but not
    from the original mask.
Let A be the subject of S of pixels that belong to one of
    the split regions. Do not include pixels from the fat-
    tened mask.
Let B be the subset of S of pixels that belong to one of the
    split regions. Again, do not include pixels from the
    fattened mask.
Let L be the set of pixels that belong to S but not to A or
    B.
While L is not empty Fatten A by adding to it all the pixels
    in S that border pixels of A.
    Fatten B by adding to it all the pixels in S that border
        pixels of B.
    Let L be the set of pixels that belong to S but not A or
        B.
End-While
```

The above described process segments the image using only the incomplete boundaries defining the image. It does not use any other information in the image. Because it does not rely on assumptions as to the shape of lines or curves, the algorithm of the program is very robust and is able to segment the image of FIG. 2a into the segments shown in FIG. 2b. Thus, the algorithm provides a highly effective technique for segmenting images.

what is claimed is:

1. A method of segmenting a pixel based image comprising:

a first step of identifying pixels containing borders in said image and labeling the border containing pixels as mask pixels and labeling the remaining pixels as region pixels;

a second step of forming from said region pixels a list of fattening pixels adjacent to said mask pixels;

a third step of testing each region pixel in said list to determine if such pixel separates said region pixels into two disjoint regions;

a fourth step of adding said region pixels on said list to said mask pixels, repeating said second, third and fourth steps at least once, and growing said disjoint regions back to the original size of said such regions.

2. A method as recited in claim 1, wherein after testing each pixel in said third step, the pixel tested is added to said mask pixels if the pixel tested divides the region pixels into disjoint regions.

3. A method as recited in claim 1, wherein said second, third and fourth steps are repeated a predetermined number of times.

4. A method as recited in claim 1, wherein said second, third and fourth steps are repeated until all said region pixels have been added to said mask pixels.

5. A method as recited in claim 1, wherein said disjoint regions are retained as separate regions only if said disjoint regions are of a predetermined size after being grown back to their original size.

6. A method as recited in claim 1, wherein each disjoint region is uniquely labeled upon being divided by the pixel being tested.

7. A method as recited in claim 6, wherein said disjoint regions are retained as separate uniquely labeled regions only if said disjoint regions are of a predetermined size after being grown back to their original size.

8. A system for segmenting a pixel based images comprising a source of pixel based images, a data processor connected to receive a pixel based image from said source, said data processor being programmed to perform the steps of identifying pixels containing borders in said image and labeling the border containing pixels as mask pixels and labeling the remaining pixels as region pixels;

forming from said region pixels a list of fattening pixels adjacent to said mask pixels;

testing each pixel in said list to determine if such pixel separates said region pixels into two disjoint regions;

adding said pixels on said list to said mask pixels, repeating said forming, testing, and adding for a number of iterations, and growing said disjoint regions back to the original size of said such regions.

9. A system as recited in claim 8, wherein said data processor after testing each pixel, adds the pixel tested to said mask pixels if the pixel tested divides the region pixels into disjoint regions.

10. A system as recited in claim 8, wherein said number of iterations is a predetermined number.

11. A system as recited in claim 8, wherein said data processor repeats said iterations until all said region pixels have been added to said mask pixels.

12. A system as recited in claim 8, wherein said data processor retains said disjoint regions as separate regions only if said disjoint regions are of a predetermined size after being grown back to their original size.

13. A system as recited in claim 8, wherein said data processor uniquely labels each disjoint region upon being divided the pixel being tested.

14. A system as recited in claim 13, wherein said data processor retains said disjoint regions as uniquely labeled separate regions only if said disjoint regions are of a predetermined size after being grown back to their original size.

\* \* \* \* \*